US 6,357,713 B1

(12) United States Patent
BeBow

(10) Patent No.: US 6,357,713 B1
(45) Date of Patent: Mar. 19, 2002

(54) SMALL SPACE CONTAINER BRACKET

(75) Inventor: Patrick T. BeBow, Racine, WI (US)

(73) Assignee: S. C. Johnson Commerical Markets, Inc., Sturtevant, WI (US)

( * ) Notice: Subject to any disclaimer, the term of this patent is extended or adjusted under 35 U.S.C. 154(b) by 0 days.

(21) Appl. No.: 09/500,859

(22) Filed: Feb. 9, 2000

(51) Int. Cl.[7] .................................................. A47F 1/10
(52) U.S. Cl. .................. 248/300; 248/311.2; 248/312.1
(58) Field of Search ........................... 248/311.2, 311.3, 248/312, 312.1, 313, 314, 316.8, 300

(56) References Cited

U.S. PATENT DOCUMENTS

| | | | | |
|---|---|---|---|---|
| 3,090,590 A | | 5/1963 | Hester | 248/346 |
| 3,627,248 A | * | 12/1971 | Nelson | 248/309.1 |
| 3,794,285 A | * | 2/1974 | Barts | 248/311 |
| 3,872,868 A | * | 3/1975 | Kline | 604/403 |
| 3,938,769 A | * | 2/1976 | Wetherbee | 248/312 |
| 3,964,709 A | | 6/1976 | LaBelle et al. | 248/133 |
| 4,278,225 A | * | 7/1981 | Phelps | 248/311.3 |
| D304,421 S | * | 11/1989 | Holdaway | D8/373 |
| 4,880,133 A | * | 11/1989 | Cullinane | 220/737 |
| 5,397,089 A | * | 3/1995 | Kataoka | 248/311.2 |
| D384,877 S | | 10/1997 | Perrin et al. | D8/354 |
| 5,704,495 A | * | 1/1998 | Bale et al. | 211/71 |
| 5,758,853 A | | 6/1998 | Perrin et al. | 248/311.2 |
| 5,971,335 A | * | 10/1999 | Perrin et al. | 248/311.2 |

* cited by examiner

Primary Examiner—Leslie A. Braun
Assistant Examiner—Naschica S. Morrison
(74) Attorney, Agent, or Firm—Warren R. Bovee; Renee J. Rymarz; Neil E. Hamilton

(57) ABSTRACT

A device for holding a dispensing container, having a back member with a top and bottom member projecting in the same direction from the back member. The bottom member projects out laterally in a downward direction from the back member angling the dispensing container to allow increased access to a pump action dispensing mechanism. The top member contains an opening allowing a neck of the dispensing container to be engaged with the pump action dispensing mechanism and locked into place to prevent its removal. The bottom member includes a lip that is in association with the dispensing container, preventing the dispensing container from moving.

9 Claims, 4 Drawing Sheets

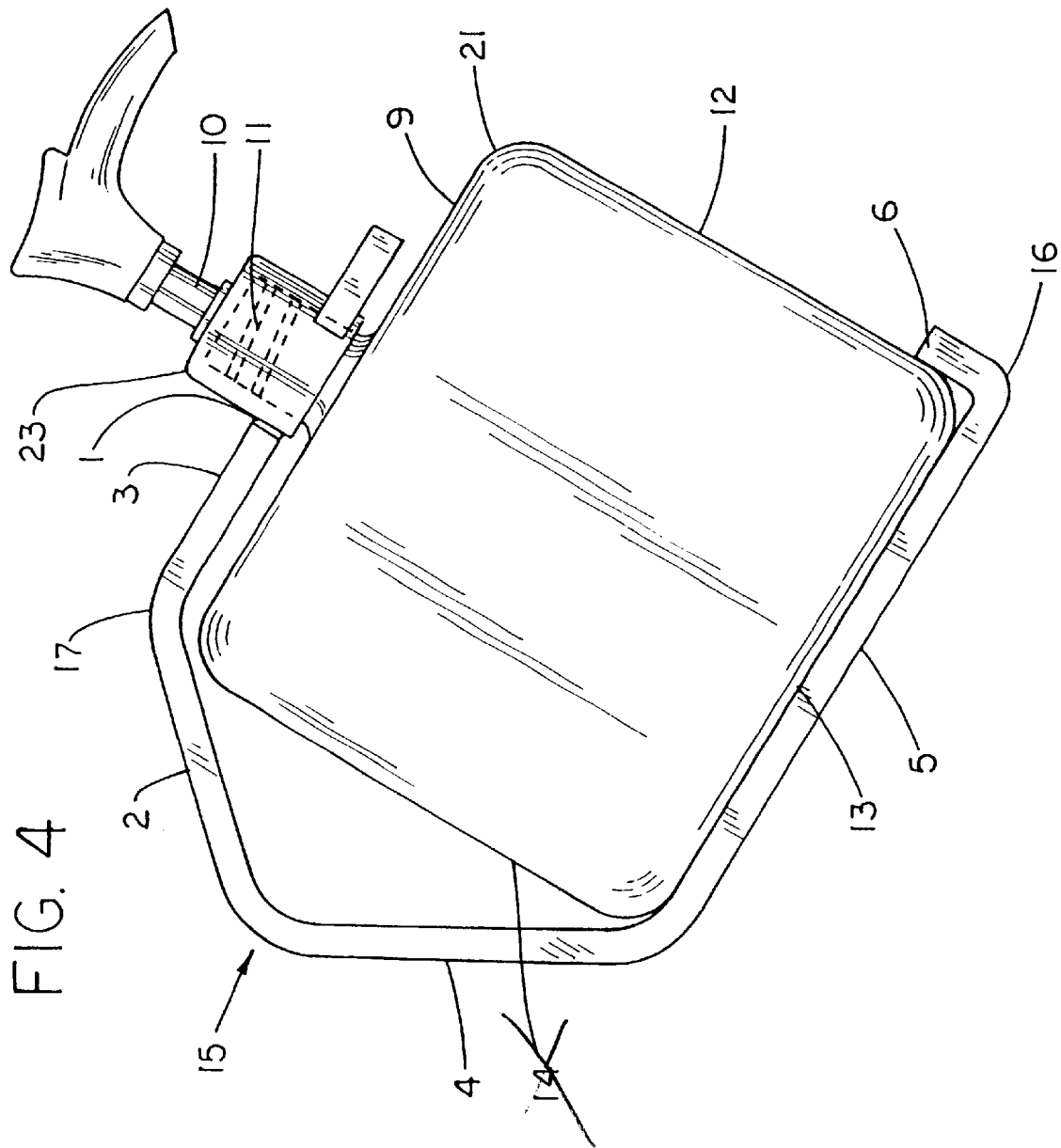

SMALL SPACE CONTAINER BRACKET

CROSS-REFERENCE TO RELATED APPLICATIONS

NONE

BACKGROUND OF THE INVENTION

1. Technical Field

The present invention relates generally to a holder for a dispensing container with a pump action dispensing mechanism. More particularly, it relates to a bracket that allows a dispensing container to be secured to a surface while still allowing easy access to the dispensing container.

2. Background Art

The use of the dispensing containers and pump action dispensing mechanism is beneficial in preventing the contamination of the product within the dispensing container, while eliminating the need for the bulky standard dispensing unit. The standard dispensing unit used is a large wall-mounted unit that is about double the size of the dispensing container, which is placed inside. The pump action dispensing mechanism can alternatively be used with the dispensing container. The pump action dispensing mechanism screws onto the neck of the container eliminating the need for the standard dispensing unit. The two major draw backs of using a dispensing containers without the standard dispensing unit is the lack of security, the container and the pump action dispensing mechanism can easily be taken by any user, while also taking up limited counter space.

One attempt at a solution is employed in Holder for Dispensing Container, which is the subject of U.S. Pat. No. 5,758,853. In this patent a bracket is described that mounts a dispensing container to a wall. The top of the dispensing container with the pump action dispensing mechanism is passed through a large circular opening in the upper extension of the bracket and bottom is placed on the lower extension of the bracket.

The prior art does not afford a solution to the problem of providing a bracket that uses a minimal amount of space while still giving security and limited mobility for a dispensing container.

The objects of the invention therefore are:
a. To allow the use of a dispensing container to limit the chances of contamination.
b. To allow a dispensing container to be used while using a minimal amount of space.
c. To allow the use of a dispensing container without the standard dispensing unit while still providing security from theft.
d. To allow for easy dispensing of the contents of the dispensing container.

SUMMARY OF INVENTION

The primary objective of the present invention is a device for mounting the dispensing container and pump action dispensing unit to the wall utilizing minimal space while securing the container and restricting mobility. This restriction of mobility makes the use of these containers more desirable in a commercial setting where the amount of users is unlimited. The invention also angles the pump action dispensing unit and the dispensing container forward making access to the pump action dispensing mechanism easier for the user. The device is a holder for a dispensing container, the dispensing container comprising a top including a neck, a base, a front side, a back side, a right side, and a left side.

The invention comprises a back member, top member, and a bottom member, wherein the top and bottom member extend laterally from the back member in the same direction. The top member and the bottom member extend at obtuse angles from the back member. The angle is a sufficient amount that when the back member is mounted to a wall, and the dispensing container is placed into the invention the top of the dispensing container is farther away from the back member than the base.

The top member of the device is skewed relative to the location of the dispensing container when the dispensing container is engaged with the invention. A first portion of the top member projects from the back member at an angle greater than 90 degrees. A second portion of the top member changes slope forming an angle greater than 90 degrees from the first portion. The second portion of the top member runs parallel to the bottom member. The change in slope of the top member allows the top of the dispensing container to be held securely in place at its skewed position in the device. The top member contains an opening that allows for the engaging of the dispensing container neck. The opening in the top member begins at the center of the second section of the top member and continues through the side of the top member. The opening is circular at the end located in the center of the second section of the top member and continues as a channel from the circular center to the side of the top member. The neck of the container passes unobstructed through the opening to be engaged with the pump action dispensing mechanism. The container may be passed from the side of the device to the center of the device while the neck of the container passes through the opening from the side to the end of the opening at the center of the second portion of the top member. When the neck of the dispensing container is fully engaged in the circular portion at the end of the opening, the pump action dispensing mechanism can be connected to the neck of the dispensing container which locks the dispensing container into the invention preventing mobility.

The bottom member of the invention contains one or more lips that can extend up to the width of the distal end of the bottom member. The lips may extend the entire front side of the bottom member and are in association with the dispensing container preventing it from forward movement. These lips further prevent the mobility of the dispensing container when locked into the invention.

The back member is substantially planar allowing maximum connection to the mounting surface. The back member has at least one means for mounting the device including an opening that a fastening means may be passed through to secure the device to the mounting surface. The features and innovation of the device are further clarified with the following descriptions, appended claims, and drawings.

BRIEF DESCRIPTION OF THE DRAWINGS

FIG. 4 is a side view of the device with a dispensing container.

DETAILED DESCRIPTION OF THE INVENTION

Figure 1:
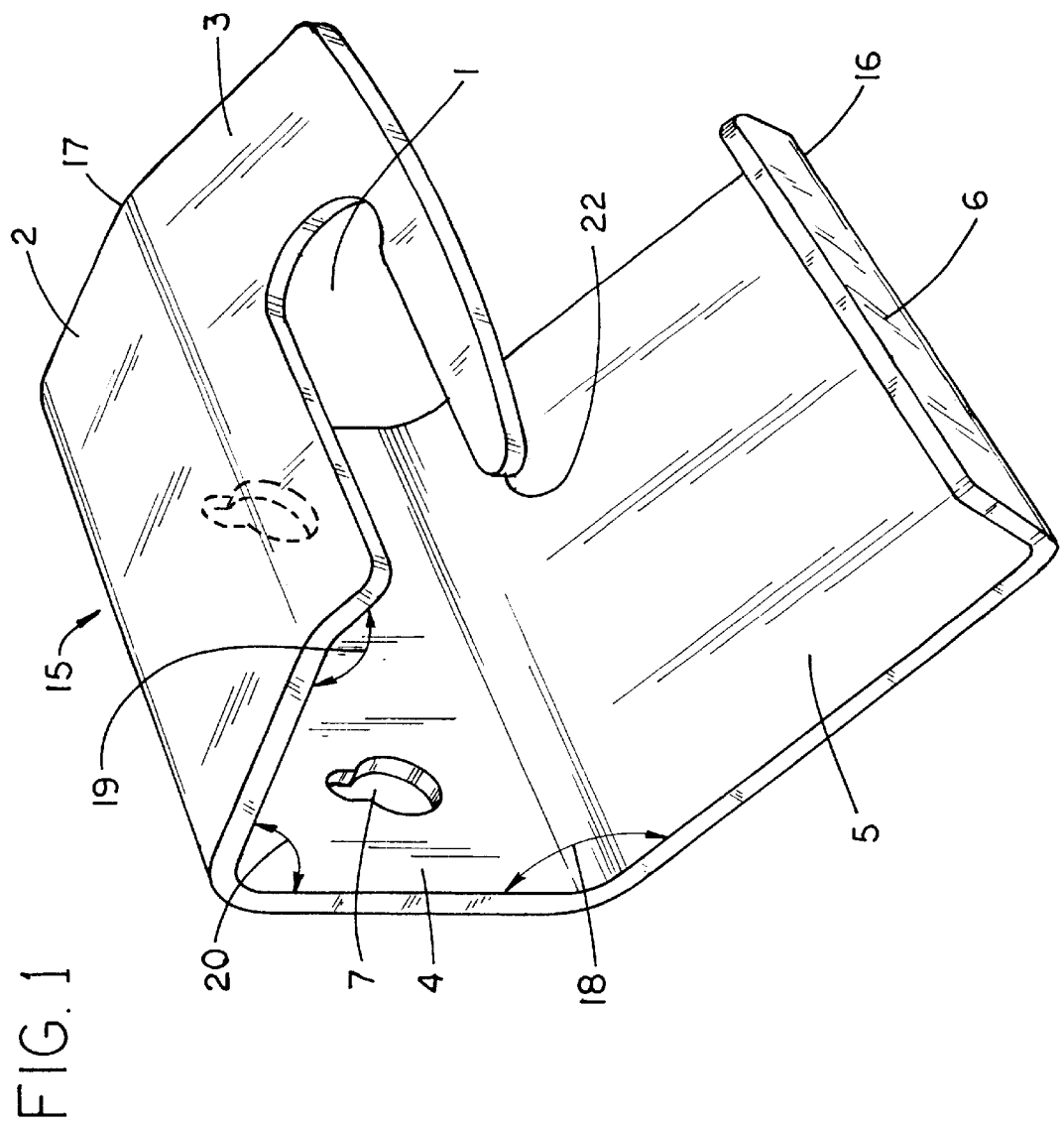
FIG. 1 is a side elevational view of the device of this inventor.
Figure 2:
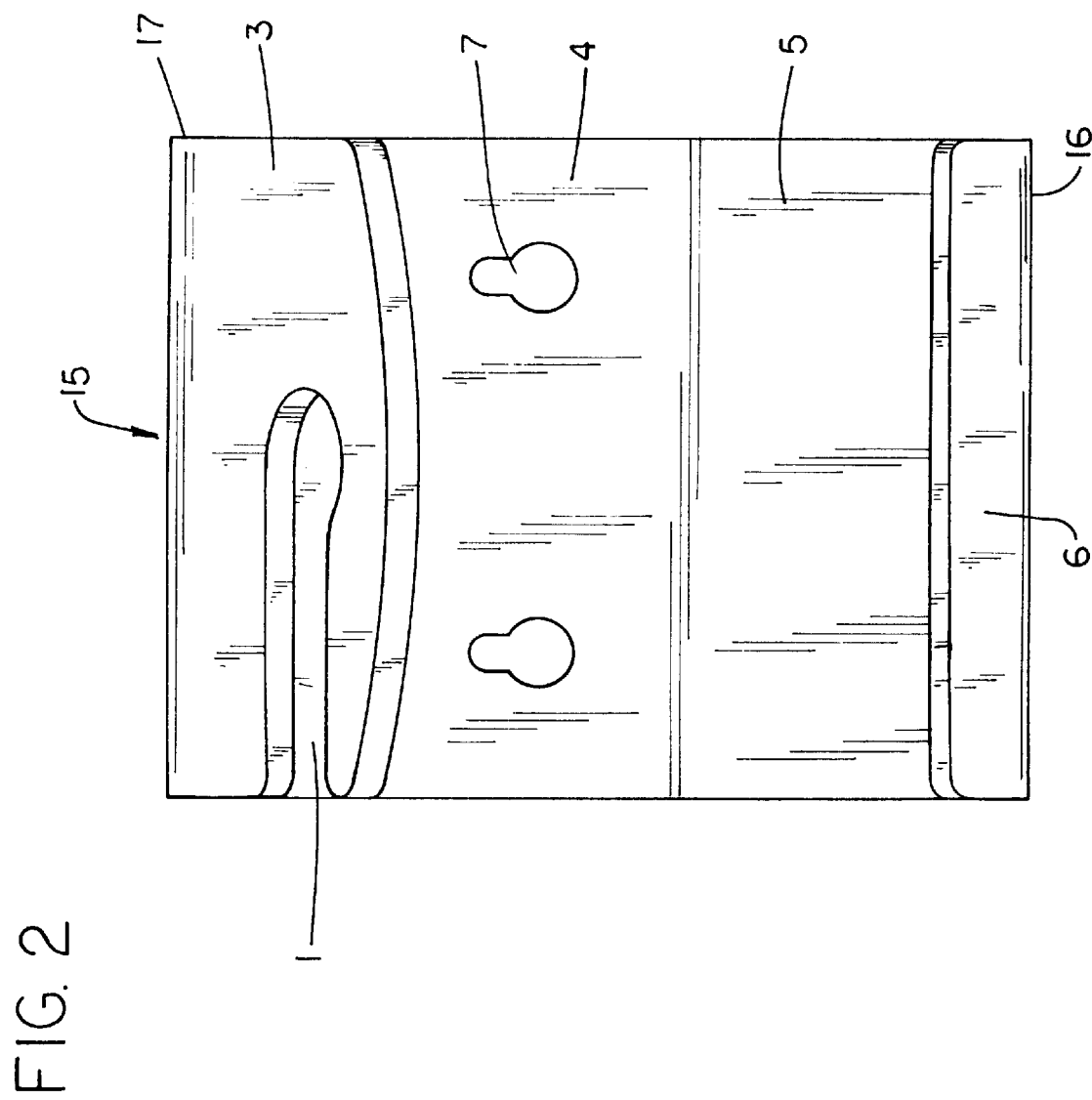
FIG. 2 is a front full view of the device.
Figure 3:
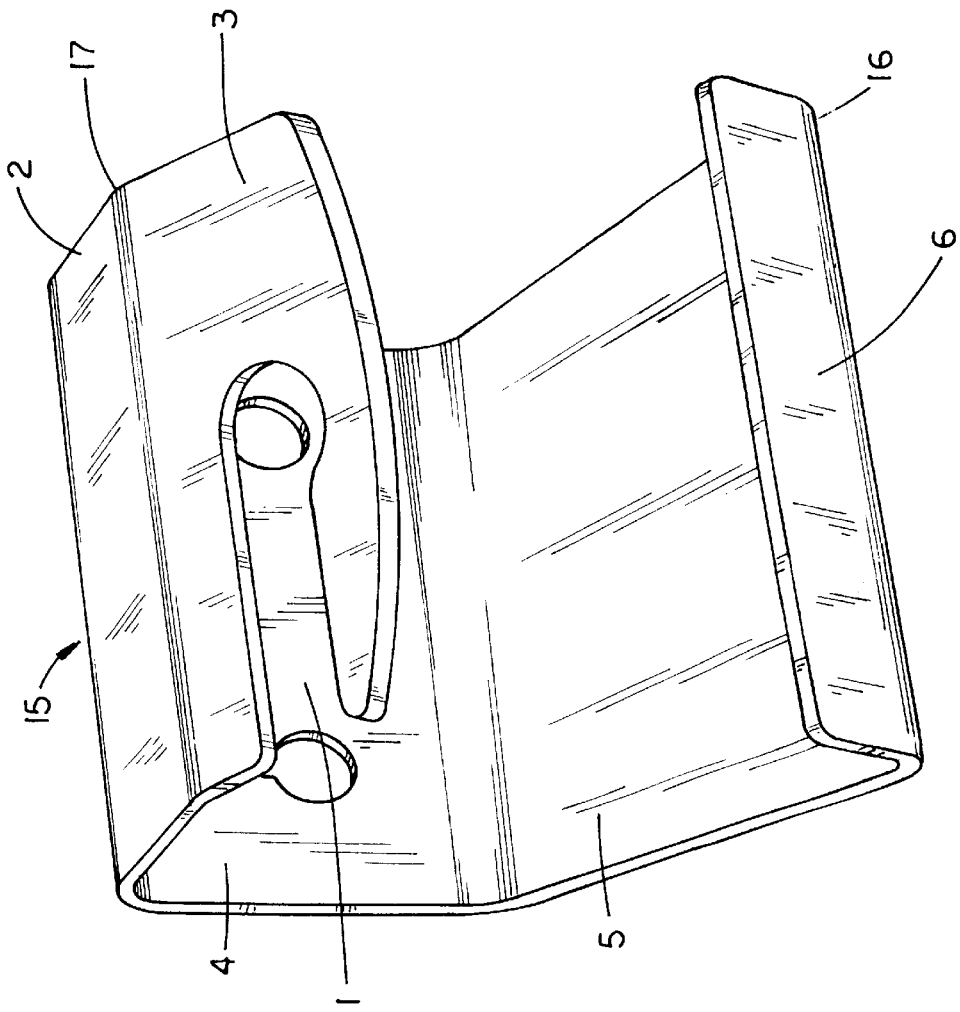
FIG. 3 is a top, front perspective view of the device.

In accordance with the preferred embodiment of the present invention, a device generally 15 for holding a dispensing container 21 is shown in the figures. The device 15 is used to hold a dispensing container 21 when the device 15 is mounted to a vertical surface. Thereby, allowing the dispensing container 21 to be easily accessed while taking up a minimal amount of space. The device 15 can be injection molded from acrylic for its easy maintenance and inexpensive production cost or any other substance that is durable enough and easily maintainable for the devices 15 specified commercial use.

The device 15 includes a back member 4 a top member 17 and a bottom member 5. The top member 17 extends from the back member 4 laterally, and in the same direction as the bottom member 5, forming an angle 20 greater than 90 degrees from the back member 4. The top member 17 has two portions, a first portion 2 and a second portion 3. The first portion 2 and the second portion 3 are distinguished by a change of slope in the top member 17. The change in slope of the top member 17 forms an angle 19 greater than 90 degrees. The change in slope of the top member holds the dispensing container 21 in place, which is at an angle so that the user has easier access to a pump action dispensing mechanism 10. The bottom member 5 is at an obtuse angle from the back member 4 to support the dispensing container 21. The angle 18 of the bottom member 5 is greater than 90 degrees. The bottom member 5 and the second portion 3 of the top member 17 run parallel to each other allowing for the engagement of the base of dispensing container 13 and the top of the dispensing container 9 respectfully. The angling of the top member 3 and the bottom member 5 angles the dispensing container 21 causing the top of the container 9 to be at a greater distance from the back member 4 than the base. The bottom member 5 also has a lip 6 that is perpendicular to a distal end 16 of the bottom member 5. The lip 6 is located in a position that allows it to be in association with the container 21 at the base of the front side 12 of the dispensing container 21. When the container 21 and lip 6 are in association, the dispensing container 21 is secured in place making use easier and allowing for greater security from theft.

The second portion 3 of the top member 17 contains an opening 1 that is engaged with a neck 11 of the dispensing container 21. The opening 1 originates in the center of the second portion 3 of the top member 17 and continues to the side 22 of the top member 17. The preferred opening 1 is circular in the center of the second portion 3 of the top member 17. The opening 1 then extends as a channel to the side 22 of the top member 17 so as to provide an unobstructed path to the circular portion of the opening 1. The neck 11 of the dispensing container 21 is fully engaged with the device when it has passed through the channel of the opening 1 and is contained completely in the circular portion of the opening 1. When the neck 11 of the dispensing container 21 is fully positioned in the opening 1, the neck 11 can be engaged with a cap 23 and the pump action dispensing mechanism 10. Once the neck 11 of the dispensing container 21 is fully engaged with the cap 23 and the pump action dispensing mechanism 10, the dispensing container is locked into place and can not be removed. This feature allows for the security of the dispensing container 21 making its use in commercial settings more desirable. The device 15 once fully engaging with the dispensing container 21, pump action dispensing mechanism 10 and the lip 6 allows for security. The dispensing container 21 can not be easily removed when the dispensing unit is used in a commercial setting where there are multiple users through out the day.

The back member 4 contains at least one means for mounting the device 15 to a horizontal surface. The method of mounting includes two holes 7 that allow for a screw or other fastening means to pass through and connect to the mounting structure. The fastening means may also be an adhesive substance that is applied to the back member 4 and the mounting surface securing the device 15 to the surface. The mounting of the device 15 gives extra security while taking up minimal amounts of space. The advantage of the ability to mount the device 15 is that in areas with limited space the device 15 provides the user the ability to use a dispensing container 21 without the loss of any space due to its placement of the dispensing container 21. The compact size of the device 15 also increases its desirability as a space saver. The size of the device 15 allows for a limited amount of wall mounting space to be needed to secure the device 15 while still freeing up counter space. This factor makes this invention desirable over other devices.

Although the present device has been described in the preceding detail with references to certain preferred embodiments other versions are possible. Therefore, the scope of the appended claims should not be limited to the description of the detailed version contained herein.

I claim:

1. A device for holding a dispensing container, the container including a top including a neck, a base, and side walls, the device comprising:
    a) a back member;
    b) a bottom member extending laterally from the back member;
    c) a top member, spaced from the bottom member, the top member extending laterally from the back member in the same direction and having a front portion generally parallel to the bottom member, said top member front portion having a front and a pair of sides;
    d) the bottom member extending out laterally from the back member at an obtuse angle causing the top of the container when held in the device to be at a greater distance from the back member than the base of the container;
    e) the top member having an opening extending from one of said sides of the top member towards the center of the top member, for receiving the neck of the container; and
    f) the distal end of the bottom member having one or more lips, extending up to the entire width of the distal end of the bottom member for contacting the side of the container to permit the container to be slid laterally of the device into a final position.

2. The device of claim 1 wherein the back member has one or more openings for receiving a fastening means to secure the device to a surface.

3. The device of claim 1 where the top member, bottom member and back member all are essentially planar.

4. The device of claim 3 wherein a first portion of the top member extends from the back member forming an angle greater than 90 degrees then after staying at a consistent slope, a second portion of the top member changes slope forming an angle greater than 90 degrees from the first portion of the top member and extends parallel to the bottom member.

5. The device of claim 4 wherein the opening is circular at the center of the second portion of the top member and the opening extends away from the center to the side of the top member as a channel.

6. The device of claim 5 wherein the end of the opening at the center of the second portion of the top member is constructed and arranged for connection to a dispensing mechanism of the container and the channel of the opening extending to the side of the top member is of a smaller dimension than the dispensing mechanism.

7. The device of claim 6 wherein the bottom member extends from the back member, at an angle greater than 90 degrees.

8. The device of claim 7 where the second portion of the top member is parallel to the bottom member.

9. A device, for holding a dispensing container and the dispensing container comprising a top including a neck, a base, a front side, a back side, a right side, and a left side, the device comprising:

a.) a substantially planar back member;
   b.) a substantially planar bottom member extending laterally from the back member where the base of the dispensing container can be supported when placed thereon;
   c.) a substantially planar top member extending laterally from the back member and in the same direction as the bottom member containing a first section that is angled to extend in the opposite direction from the bottom member and changes slope forming a second section that is angled to extend parallel to the bottom member;
   d.) wherein the bottom member extends out laterally from the back member at an obtuse angle causing the container top to be tilted farther away from the back member than the container base and angling a pump action dispensing mechanism of the container to allow easier use of the pump action dispensing mechanism;
   e.) wherein the top member contains an opening at the center of the second portion that is circular and continues as a channel from the circular portion through a side of the top member allowing the neck of the container to pass unobstructed through the opening to be engaged with the pump action dispensing mechanism, said channel having a width less than the diameter of said circular opening;
   f.) wherein the container may be passed from the side of the device to the center of the device while the neck of the container passes through the opening from the side to an end of the opening at the center of the second portion of the top member;
   g.) wherein when the pump action dispensing mechanism is engaged with the neck of the container the container is locked into the device preventing removal;
   h.) wherein the bottom member has one or more lips, each lip extending up to the entire length of the distal edge of the bottom member;
   i.) wherein the one or more lips of the bottom member is in association with the container securing the container from forward movement;
   j.) wherein the device has a fastening means which when engaged mounts the device to a vertical surface to prevent mobility while using a limited amount of space.

* * * * *